United States Patent
Suzuki (10) Patent No.: US 8,586,216 B2
(45) Date of Patent: Nov. 19, 2013

(54) FERROMAGNETIC LAMINATED STRUCTURE AND MANUFACTURING METHOD THEREOF

(75) Inventor: Toshio Suzuki, Akita (JP)

(73) Assignees: Akita Prefecture, Akita (JP); TDK Corporation, Tokyo (JP)

( * ) Notice: Subject to any disclaimer, the term of this patent is extended or adjusted under 35 U.S.C. 154(b) by 112 days.

(21) Appl. No.: 13/323,869

(22) Filed: Dec. 13, 2011

(65) Prior Publication Data

US 2012/0154081 A1 Jun. 21, 2012

(30) Foreign Application Priority Data

Dec. 20, 2010 (JP) ................. 2010-283253

(51) Int. Cl.
*B32B 7/02* (2006.01)
*G01R 33/09* (2006.01)

(52) U.S. Cl.
USPC ............ 428/811.1; 428/811.5; 428/336; 428/337; 428/338; 428/212

(58) Field of Classification Search
None
See application file for complete search history.

(56) References Cited

U.S. PATENT DOCUMENTS

2004/0096692 A1* 5/2004 Nishikawa et al. ......... 428/689

OTHER PUBLICATIONS

Phivos Mavropoulos; "Spin injection from Fe into Si(001): Ab initio calculations and role of the Si complex band structure"; Physical Review; Aug. 27, 2008; pp. 054446-1-054446-8; vol. B, No. 78; The American Physical Society.

C. Martinez Boubeta et al.; "Magnetization reversal and magnetic anisotropies in epitaxial Fe/MgO and Fe/Mg/Fe heterostructures grown in Si(001)"; Journal of Applied Physics; Feb. 15, 2003; pp. 2126-2134; vol. 93, No. 4; American Institute of Physics.

T. Uhrmann et al.; "Characterization of embedded MgO/ferromagnet contacts for spin injection in silicon"; Journal of Applied Physics; Mar. 19, 2008; pp. 063709-1-063709-5; vol. 103; American Institute of Physics.

O.M.J. Van't Erve et al.; "Electrical injection and detection of spin-polarized carriers in silicon in a lateral transport geometry"; Journal of Applied Physics; Nov. 21, 2007; pp. 212109-1-212109-3; vol. 91; American Institute of Physics.

Y. Ando et al.; "Electrical injection an detection of spin-polarized electrons in silicon through an Fe3Si/Si Schottky tunnel barrier"; Journal of Applied Physics; May 5, 2009; pp. 182105-1-182105-3; vol. 94; American Institute of Physics.

Tomoyuki Sasaki et al.; "Evidence of Electrical Spin Injection Into Silicon Using MgO Tunnel Barrier"; IEEE Transactions on Magnetics; Jun. 2010; pp. 1436-1439; vol. 46, No. 6; IEEE.

Saroj P. Dash; "Electrical creation of spin polarization in silicon at room temperature"; Nature; Nov. 26, 2009; pp. 491-494; vol. 462, No. 26; Macmillan Publishers Limited.

\* cited by examiner

*Primary Examiner* — Kevin Bernatz
(74) *Attorney, Agent, or Firm* — Paul F. Neils; Edwards Neils PLLC (57) ABSTRACT

A large spin-polarized current can be provided. A single crystal MgO layer is grown on an Si single crystal substrate, being lattice-matched. Thereon, a ferromagnetic metal layer is grown. Growth plane of MgO layer formed on (100) plane of Si single crystal substrate is (100) plane. At interface between Si single crystal substrate and MgO layer, Si (100) [110] and MgO (100) [100] directions are parallel. FIG. 2(A) shows Si (100) plane, FIG. 2(B) MgO (100) plane, and FIG. 2(C) the state of these two planes being lattice-matched. Si (100) plane in FIG. 2(A) is constituted by Si atoms 111 alone, while MgO (100) plane in FIG. 2(B) is constituted by Mg atoms 121 and oxygen (O) atoms 122. MgO (100) plane is grown on Si (100) plane, and as shown in FIG. 2(C), Si (100) [110] and MgO (100) [100] directions are parallel at the interface.

12 Claims, 9 Drawing Sheets

FERROMAGNETIC LAMINATED STRUCTURE AND MANUFACTURING METHOD THEREOF

CROSS-REFERENCE TO RELATED APPLICATIONS

This application claims priority from Japanese Patent Application No. 2010-283253, filed Dec. 20, 2010, the contents of which are hereby incorporated by reference in their entirety.

BACKGROUND OF THE INVENTION

1. Field of the Invention

The present invention relates to the construction of a ferromagnetic laminated structure in which a laminated structure including a ferromagnetic layer and silicon is formed for injecting spin-polarized electrons from the ferromagnetic layer into the silicon, and it also relates to a manufacturing method thereof.

2. Description of the Related Art

In recent years, research and development of spin-electronic devices, which utilize both the function of spins in a ferromagnetic layer and that of electrons in electrical conduction, has been actively performed. Examples of such a device include the magnetic head in a hard disk drive and an MRAM (Magnetic Random Access Memory). Further, an idea of spin MOS-FET, which adds the function of spins to the MOS-FET (Metal-Oxide-Semiconductor-Field-Effect Transistor), has been proposed, research and development of semiconductor (silicon) spin-electronic devices being also actively performed. In this case, it is an extremely important technique to inject spin-polarized electrons into a semiconductor (silicon) from a ferromagnetic layer. In order to enhance the efficiency of injection of spin-polarized electrons into the silicon, various structures (ferromagnetic laminated structures) have been proposed.

In Non-Patent Document 1, it is theoretically predicted that, in a structure in which iron (Fe) is laminated on the (100) plane of a silicon (Si) single crystal (hereinafter, referred to as an Fe/Si (100) laminated structure), up to 100% of the spin-polarized electrons are injected into the Si. Herein, it is presupposed that the (100) plane of the Fe is grown on the (100) plane of the Si, and the [110] orientation on the Si (100) plane (hereinafter, referred to as the Si (100) [110]) and the [110] orientation on the Fe (100) crystal plane (hereinafter, referred to as the Fe (100) [110]) are arranged parallel to each other, a flat and abrupt interface being formed between these. With this combination, a large spin polarization current (a current caused to flow by the injection of spin-polarized electrons) is obtained because the symmetrical orbits of the electrons in the Fe and Si are coupled through the Schottky barrier at the interface. In other words, it has been theoretically revealed that, if the Fe (100) [110] and the Si (100) [110] are arranged crystallographycally parallel to each other, a large spin polarization current can be obtained.

However, actually, since Si and Fe have a high reactivity, it is difficult to obtain such an ideally flat and abrupt interface. Thus, actually preparing a ferromagnetic laminated structure to experimentally examine the structure is practiced.

For example, as a construction in which another substance is inserted between the Si and Fe, Non-Patent Document 2 reports the experimental result for a structure having a construction in which MgO is inserted therebetween. Herein, it has been indicated that, among the Fe layer, the MgO layer, and the Si (100) substrate, there is given a crystal orientation relationship of the Fe (100) [100], MgO (100) [110], Si (100) [110].

In this case, the plane which is arranged parallel to the Si (100) [110] is not the Fe (100) [110] disclosed in Non-Patent Document 1, but the Fe (100) [100], which is different in direction therefrom by 45°. In other words, the mechanism disclosed in Non-Patent Document 1 that gives a high spin polarization current will not be developed. In addition, in this construction, there exists a large lattice mismatch of −22.5% between the Si and the MgO, and thus at this interface, a lattice-matched crystal arrangement cannot be obtained. Therefore, this interface has a number of crystal defects which can be an electron-scatterer, thus spin-polarized electrons being scattered thereat, which makes it impossible to obtain a large spin polarization current.

Non-Patent Document 3 also discusses a FeCoB/MgO/Si laminated structure. Herein, the MgO has an amorphous structure, and it has been confirmed with a transmission electron microscope that the interface between the MgO layer and the Si is not lattice-matched. In addition, the MgO layer having an amorphous structure results in the FeCoB being polycrystalline, thus also in this case, the relationship between the Si (100) [110] direction and the Fe (100) [110] direction that is disclosed in Non-Patent Document 1 is not implemented. Furthermore, the MgO layer having an amorphous structure causes the injected electrons to be scattered in the MgO, which can have a large effect on the injection efficiency. Thus with such structure, it is impossible to obtain a large spin polarization current.

As a result of these disadvantages, no structures having the ideal interface disclosed in Non-Patent Document 1 have been actually obtained. Further, various ferromagnetic laminated structures having a structure in which an MgO layer is inserted between the ferromagnetic metal layer and the Si have been examined to be evaluated. In such a structure, crystal defects at the interface between the MgO layer and the Si or the structure of the MgO layer itself can have an adverse effect on the efficiency of injection of electrons. In other words, with conventional ferromagnetic metal/MgO/Si laminated structures, a crystal arrangement has not been obtained which is lattice-matched so as to suppress scattering of spin-polarized electrons at the laminated interface between the MgO film and the Si, thus a flat and abrupt interface structure cannot be obtained. Further, the orientation relationship between the Si and Fe crystals that has been designed from the theoretical computation in order to realize the spin injection with a high efficiency is not implemented. Consequently, such structures will not have sufficient properties for practical use as a spin injection electrode.

On the other hand, Non-Patent Document 4 discloses that, in an Fe/Al$_2$O$_3$/Si laminated structure, spin-polarized electrons are injected into the channel of the Si, and the resultant conduction (spin conduction) in the channel has been measured at a temperature of 10K. In this case, the Al$_2$O$_3$ film has an amorphous structure, and at the laminated interface with the Si, lattice matching is not obtained, thus at this interface, scattering of spin-polarized electrons cannot be avoided. Furthermore, the Fe given on the amorphous Al$_2$O$_3$ film is polycrystalline. Therefore, the relationship between the Si (100) [110] direction and the Fe (100) [110] direction that is disclosed in Non-Patent Document 1 is not implemented, which makes it impossible to obtain a large spin polarization current. As a result of this, the spin conduction was detected only at a temperature as low as 10K.

Further, Non-Patent Document 5 discloses that, using an Fe$_3$Si/Si (111) laminated structure, the efficiency of injection of spin-polarized electrons was measured, the spin conduction being detected at a temperature of 50K or lower. In this case, lattice matching was obtained at the laminated interface between the Fe$_3$Si film and the Si. However, the (111) plane of the Si is used, and the relationship that is disclosed in Non-Patent Document 1 is not implemented, the injection efficiency being lowered with the result of the detection temperature being up to 50K.

Non-Patent Document 6 discloses that, using an Fe/MgO/Si (100) laminated structure as a spin injection electrode, the efficiency of injection of spin-polarized electrons into the Si channel, and the resulting conduction (spin conduction) in the channel were actually measured. As a result thereof, the injection of spin-polarized electrons and the spin conduction were confirmed at a temperature of up to 150K. However, actually, the spin polarization rate was as extremely low as 2%, which indicates that the mechanism disclosed in Non-Patent Document 1 was not developed. Therefore, it can be estimated that the structure of the laminated film is the laminated film structure disclosed in Non-Patent Document 2 or 3.

On the other hand, Non-Patent Document 7 discloses that, using an Ni$_{80}$Fe$_{20}$/Al$_2$O$_3$/Si (100) laminated structure, the injection of spin-polarized electrons was confirmed also at room temperature (300K). However, the spin conduction was not confirmed. In other words, a ferromagnetic laminated structure having sufficient properties was not obtained. This means that, as is the case with Non-Patent Document 4, the Al$_2$O$_3$ film is produced as an amorphous structure, which makes it impossible to obtain lattice matching at the laminated interface of the Si, and moreover the Fe is given as a polycrystalline structure. Therefore, the requirement for orientation relationship between the Si and the Fe crystals that is disclosed in Non-Patent Document 1 is not met, which makes it impossible to obtain a large spin polarization current.

CITATION LIST

Non-Patent Literature

Non-Patent Document 1
"Spin Injection from Fe into Si (001): Ab initio Calculations and Role of the Si Complex Band Structure", Phivos Mavropoulos, *Physical Review B*, vol. 78, p. 054446, (2008)
Non-Patent Document 2
"Magnetization Reversal and Magnetic Anisotropies in Epitaxial Fe/MgO and Fe/MgO/Fe Heterostructures Grown on Si (001)", C. Matrinez Boubeta, A. Cebollada, J. F. Calleja, C. Contreras, F. Peiro, and A. Cornet, *Journal of Applied Physics*, vol. 93, p. 2126, (2003)
Non-Patent Document 3
"Characterization of Embedded MgO/Ferromagnet Contacts for Spin Injection in Silicon", T. Uhrmann, T. Dimopoulos, H. Bruckl, V. K. Lazarov, A. Kohn, U. Paschen, S. Weyers, L. Bar, and M. Ruhrig, *Journal of Applied Physics*, vol. 103, p. 063709, (2008)
Non-Patent Document 4
"Electrical Injection and Detection of Spin-Polarized Carriers in Silicon in a Lateral Transport Geometry", O. M. J. van't Erve, A. T. Hanbicki, M. Holub, C. H. Li, C. Awo-Affouda, P. E. Thompson, and B. T. Jonker, *Applied Physics Letters*, vol. 91, p. 212109, (2007)
Non-Patent Document 5
"Electrical Injection and Detection of Spin-Polarized Electrons in Silicon through an Fe$_3$Si/Si Schottky Tunnel Barrier", Y. Ando, K. Hamaya, K. Kasahara, Y. Kishi, K. Ueda, K. Sawano, T. Sadoh, and M. Miyano, *Applied Physics Letters*, vol. 94p. 182105, (2009)

Non-Patent Document 6
"Evidence of Electrical Spin Injection into Silicon Using MgO Tunnel Barrier", T. Sasaki, T. Oikawa, T. Suzuki, M. Shiraishi, Y. Suzuki, and K. Noguchi, *IEEE Transactions on Magnetics*, vol. 46, p. 1436, (2010)
Non-Patent Document 7
"Electrical Creation of Spin Polarization in Silicon at Room Temperature", S. P. Dash, S. Sharma, R. S. Patel, M. P. de Jong, and R. Jansen, *Nature*, vol. 462, p. 491, (2009)

Thus, in Non-Patent Document 1, a theoretical discussion about the case where the Si (100) plane is used has been made as a guideline for obtaining a high efficiency of injection of spin-polarized electrons, and an optimum structure has been proposed, however, there is no actual example in which the flat and abrupt interface and the crystal orientation relationship which are the presupposition for this design have been implemented, therefore, there is no example in which a large spin polarization current and the spin conduction in the Si were observed at room temperature. In other words, up to now, no ferromagnetic laminated structures having a high efficiency of injection of spin-polarized electrons have been obtained.

In view of such problems, the present invention has been made, and it is an object of the present invention to provide solutions to the problems.

SUMMARY OF THE INVENTION

In order to solve the aforementioned problems, the present invention has the following configurations.

According to an aspect of the present invention, there is provided a ferromagnetic laminated structure in which a magnesium oxide (MgO) layer and a ferromagnetic metal layer are sequentially formed on a silicon (Si) single crystal for injecting electrons from the ferromagnetic metal layer into the Si single crystal, the ferromagnetic laminated structure comprising: the substrate plane of the Si single crystal being the (100) plane, and the growth plane of the MgO layer being the (100) plane; and the [110] direction on the substrate plane in the Si single crystal and the [100] direction on the growth plane of the MgO layer being parallel to each other.

According to another aspect of the present invention, there is provided a ferromagnetic laminated structure, wherein the ferromagnetic metal layer is formed of iron (Fe), or an alloy of iron and cobalt (Co) (an FeCo alloy), the growth plane of the ferromagnetic metal layer being the (100) plane, and the [110] direction on the substrate plane of the Si single crystal, the [100] direction on the growth plane of the MgO layer, and the [110] direction on the growth plane of the ferromagnetic metal layer being parallel to one another.

According to another aspect of the present invention, there is provided a ferromagnetic laminated structure, wherein the MgO layer has a thickness in the range of 0.6 nm to 5 nm.

According to another aspect of the present invention, there is provided a method of manufacturing the ferromagnetic laminated structure, comprising: forming a 2×1 reconstructed plane on the substrate surface of the Si single crystal, being followed by sequentially forming the MgO layer and the ferromagnetic metal layer in vacuum.

According to another aspect of the present invention, there is provided a method of manufacturing the ferromagnetic laminated structure, wherein the MgO layer is formed by the MBE (Molecular Beam Epitaxy) technique or the electron-beam evaporation technique.

The present invention, which is configured as above, provides a ferromagnetic laminated structure which is lattice-matched at the laminated interface between the MgO film and the Si, resulting in scattering and relaxation of spin-polarized electrons being suppressed, making it possible to obtain a large spin polarization current.

DETAILED DESCRIPTION OF THE PREFERRED EMBODIMENT

A preferred embodiment of the present invention will be described hereunder with reference to the accompanying drawings. However, the present invention should not be construed as being limited to that embodiment.

Figure 1:
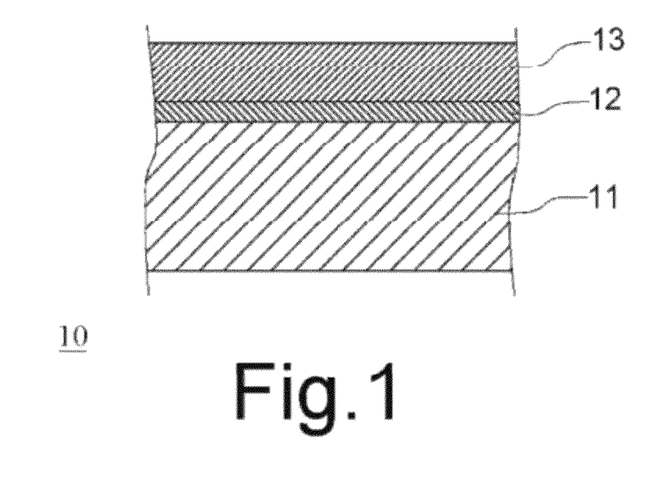
FIG. 1 is a sectional view illustrating the construction of a ferromagnetic laminated structure which provides an embodiment according to the present invention.

FIG. 1 is a sectional view of a ferromagnetic laminated structure 10 according to an embodiment of the present invention. In this ferromagnetic laminated structure 10, a single crystal MgO layer 12 is grown on an Si single crystal substrate 11, being lattice-matched. Further, thereon, a ferromagnetic metal layer 13 is formed. As is well known, the Si has a diamond crystal structure, while the MgO has a sodium chloride type cubic crystal structure. The ferromagnetic metal layer 13 has a cubic crystal structure.

The Si single crystal substrate 11 may be either a bulk crystal or an epitaxial crystal. Further, impurity doping for affording a conductivity may be performed. The thickness of the Si single crystal substrate 11 may be arbitrary. The substrate plane (the plane on which the MgO layer 12 is formed) of the Si single crystal substrate 11 is the (100) plane.

In general, on the outermost surface of the Si, a thin silicon oxide film is often formed, however, herein, the oxide film is removed before deposition of an MgO film. The oxide film can be removed by the wet process, which uses, for example, hydrofluoric acid, and it is effective to heat the Si at a temperature in the range of 300° C. to 500° C. in a vacuum chamber. In this case, on the surface of the silicon (100) plane from which the oxide film has been removed, a 2×1 reconstructed surface can be provided. Further, as the oxide film removing method, the heating sublimation technique, which heats the oxide film at a temperature in the range of 800° C. to 1200° C. in a vacuum chamber, can be used, and this method allows a 2×1 reconstructed surface to be obtained concurrently with the removal of the oxide film.

The MgO layer 12 is a thin film formed by the MBE (Molecular Beam Epitaxy) technique or the electron-beam evaporation technique. The growth plane of the MgO layer 12 formed on the (100) plane of the Si single crystal substrate 11 is the (100) plane. Further, the MgO layer 12 has a thickness in the range of 0.6 to 5.0 nm. Herein, at the interface between the Si single crystal substrate 11 and the MgO layer 12, the Si (100) [110] direction (the [110] direction on the Si (100) plane) and the MgO (100) [100] direction (the [100] direction on the MgO (100) plane) are arranged parallel to each other, lattice matching being provided. With this arrangement, the lattice mismatch between the Si and MgO is as small as −8.7%.

The ferromagnetic metal layer 13 is formed of single crystal Fe or FeCo alloy having a cubic crystalline structure, the growth plane being the (100) plane. Herein, the Fe (100) [110] direction (the [110] direction on the Fe (100) plane) and the MgO (100) [100] direction are arranged parallel to each other, lattice matching being provided. This statement is also applicable to the FeCo alloy. As the thickness of the ferromagnetic metal layer 13 that allows this construction to be easily obtained, it is preferable to provide a thickness of 0.6 nm or more, which will give a continuous film. The ferromagnetic metal layer 13 can be deposited on the MgO layer 12 by the sputtering technique, the MBE technique, the electron-beam evaporation technique, or the like. In this case, it is preferable that the deposition of the ferromagnetic metal layer 13 is performed continuously in vacuum immediately after the deposition of the MgO layer 12 (the term of vacuum used here refers to the atmosphere at a typical degree of vacuum for the above-mentioned deposition technique). In order to enhance the spin polarization rate, a third element, such as boron (B), may be involved.

In the aforementioned construction, the Si (100) [110] direction and the MgO (100) [100] direction are arranged parallel to each other, and the MgO (100) [100] direction and the ferromagnetic metal (100) [110] direction are arranged parallel to each other. Consequently, the Si (100) [110] direction and the ferromagnetic metal (100) [110] direction are arranged parallel to each other through the thin MgO layer 12.

In the aforementioned construction, spin-polarized electrons are injected from the ferromagnetic thin film 13 into the Si single crystal substrate 11, being passed through the MgO layer 12 by the tunneling effect. In other words, the electrons flow in the MgO layer 12 as a tunneling current. In this situation, as disclosed in Non-Patent Document 1, since the Si (100) [110] direction and the ferromagnetic metal (100) [110] direction are parallel to each other, the electron orbit in the ferromagnetic metal layer 13 and the electron orbit in the Si single crystal substrate 11 are coupled through the evanescent state. Thereby, a high efficiency of injection of spin-polarized electrons can be obtained. In order to increase the tunneling current flowing in the MgO layer 12, the MgO layer 12 has preferably a thickness in the range of 0.6 nm to 5 nm, and particularly preferably a thickness in the range of 0.8 nm to 1.4 nm.

Figure 2A:
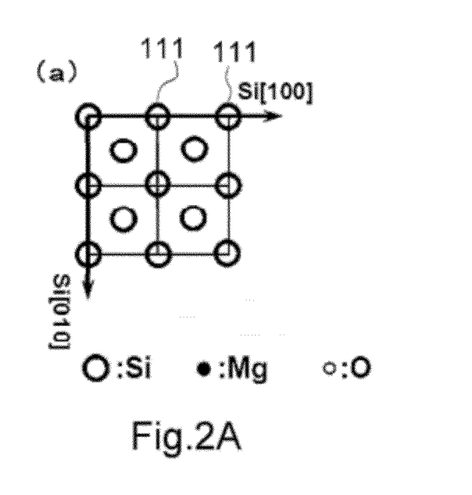
FIG. 2(A), FIG. 2(B), and FIG. 2(C) are schematic diagrams illustrating the crystal structure of each layer at the interface in the ferromagnetic laminated structure which provides the embodiment according to the present invention.
Figure 2B:
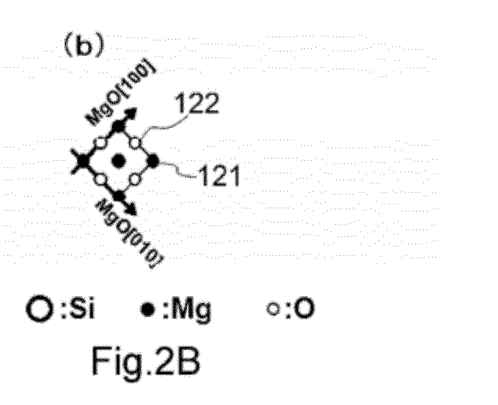
Figure 2C:
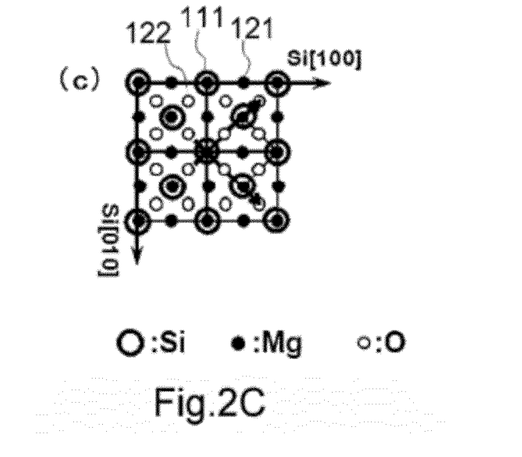

The crystal structure at the interface between the MgO layer 12 and the Si single crystal substrate 11 in the aforementioned construction is shown in FIG. 2(A), FIG. 2(B), and FIG. 2(C). Herein, FIG. 2(A) shows the Si (100) plane, FIG. 2(B) the MgO (100) plane, and FIG. 2(C) the state in which these two planes are lattice-matched. The Si (100) plane in FIG. 2(A) is constituted by Si atoms 111 alone, while the MgO (100) plane in FIG. 2(B) is constituted by Mg atoms 121 and oxygen (O) atoms 122. Herein, the MgO (100) plane is grown on the Si (100) plane, and as shown in FIG. 2(C), the Si (100) [110] direction and the MgO (100) [100] direction are parallel to each other at the interface. The lattice mismatch in this case is as small as −8.7%.

Figure 3A:
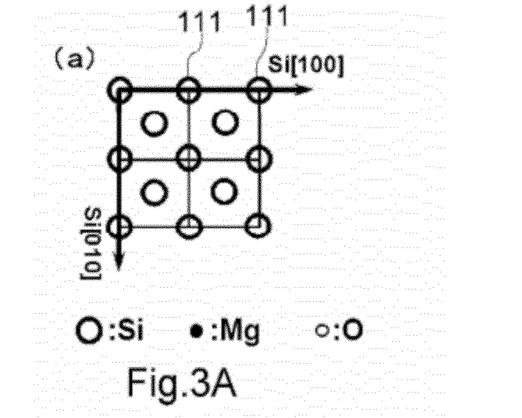
FIG. 3(A), FIG. 3(B), and FIG. 3(C) are schematic diagrams illustrating the crystal structure of each layer at the interface in a conventional ferromagnetic laminated structure.
Figure 3B:
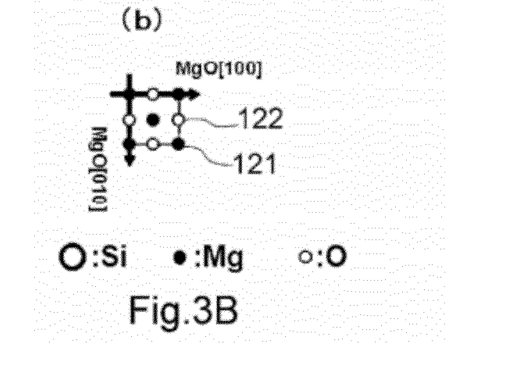
Figure 3C:
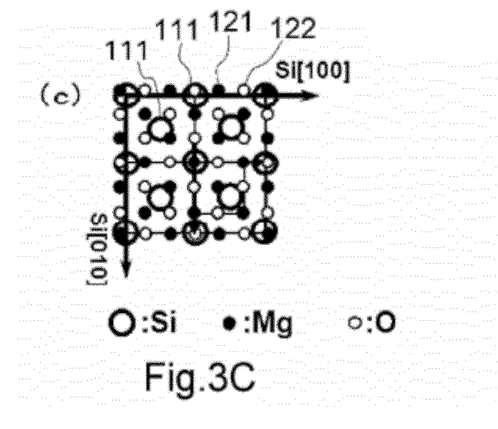

Contrarily to this, the crystal structure of the interface in the case where, as disclosed in Non-Patent Document 2, the MgO (100) plane is grown on the Si (100) plane, and at the interface, the Si (100) [110] direction and the MgO (100) [110] direction are parallel to each other is shown in FIG. 3(A), FIG. 3(B), and FIG. 3(C) in the same way as in FIG. 2(A), FIG. 2(B), and FIG. 2(C). The lattice mismatch in this case is as large as −22.4%. This means that, with the construction according to the present invention, the aforementioned structure as shown in FIG. 2(C) more reduces the lattice mismatch than the structure disclosed in Non-Patent Document 2 thus more reducing the number of crystal defects at the interface, whereby the efficiency of injection of electrons into the Si single crystal substrate 11 can be enhanced. In addition, by reducing the lattice mismatch, not only the number of crystal defects at the interface can be reduced, but also the crystalline properties of the MgO layer 12 itself can be improved. Thereby, the number of electron scatterers in the MgO layer 12 is reduced, which can also enhance the efficiency of injection of electrons into the Si single crystal substrate 11.

In addition, in the aforementioned construction, for example, the Fe (100) [100] direction and the MgO (100) [100] direction are parallel to each other. The lattice mismatch in this case is as small as −3.8%. This means that the number of crystal defects at the interface between these is fewer, thus the number of crystal defects which provide an obstruction in injecting electrons from the ferromagnetic metal layer 13 into the MgO layer 12 is reduced.

In addition, in the aforementioned construction, the Fe (100) [100] direction and the Si (100) [110] direction are parallel to each other through the thin MgO layer 12. This combination provides an arrangement which assures a highest injection efficiency, since, as disclosed in Non-Patent Document 1, the symmetrical orbits of the electrons in the Fe and Si are coupled through the evanescent state. This means that, with the construction as shown in FIG. 1 and FIG. 2(A) to FIG. 2(C), also from this view point, the efficiency of injection of electrons can be enhanced, whereby a large spin polarization current can be obtained.

Thus, in the aforementioned construction, spin-polarized electrons can be injected from the ferromagnetic metal layer 13 into the Si single crystal substrate 11 with a high efficiency.

For example, it is possible to form a transistor in the Si single crystal substrate 11, and connect a wire to the ferromagnetic metal layer 13 to control the potential thereof. Thereby, the aforementioned ferromagnetic laminated structure 10 can be used as a part of various electronic devices. Such electronic devices can utilize the electron spin polarization for their operation, for example, thus they can be used as a nonvolatile memory, a switching element operating at high speed, and the like.

EXAMPLE 1

As an example of the aforementioned construction, an MgO layer and an Fe layer (ferromagnetic metal layer) were sequentially laminated on an Si (100) single crystal substrate to examine the crystal structure of each.

First, the Si (100) single crystal substrate was cleaned with acetone and isopropyl alcohol, then the oxide film on the surface was removed with hydrofluoric acid, and further, using a hydrochloric acid-hydrogen peroxide-water mixture, an oxide film was formed. Thereafter, in an MBE apparatus, with the degree of vacuum being set at $3 \times 10^{-8}$ Pa, the substrate was heated at 1000° C. to remove the oxide film. Thereby, on the surface of the (100) plane, a 2×1 reconstructed surface was formed. After the substrate being cooled to room temperature, an MgO layer having a film thickness of 5 nm was formed by the electron-beam evaporation technique. Further, an Fe layer (ferromagnetic metal layer) having a film thickness of 13 nm was formed by the electron-beam evaporation technique, and as a protection layer, a Ti layer having a film thickness of 3 nm was produced by the electron-beam evaporation technique (sample A).

Besides this sample A, a sample having a construction in which an MgO layer and a Ti protection layer, which are the same as above, are sequentially laminated without the Fe layer in the sample A being not laminated was also produced (sample B).

Figure 4:
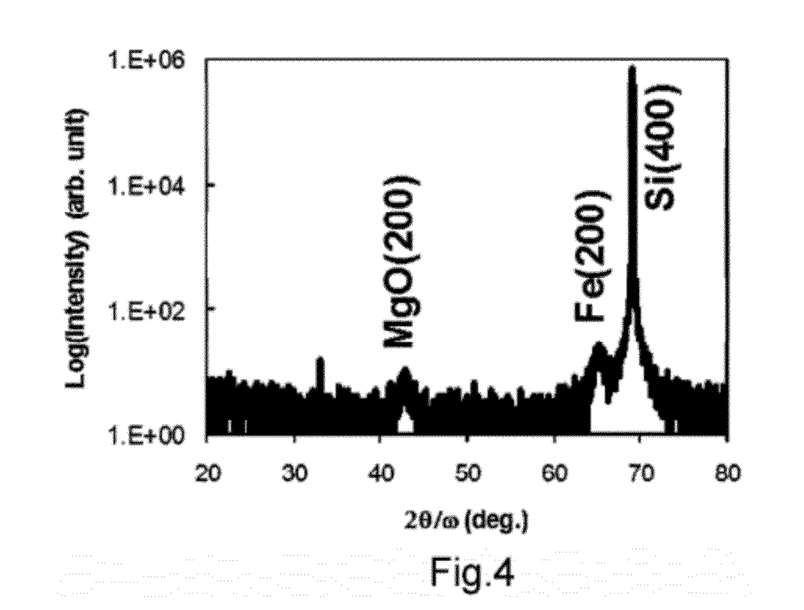
FIG. 4 gives a result of an out-of-plane X-ray diffraction measurement made for sample A in Example 1.

FIG. 4 gives a result of an out-of-plane X-ray diffraction measurement made for sample A in order to examine the orientation of the growth planes of the Fe layer and the MgO layer. For the respective diffraction peaks, the plane orientation of the corresponding substance is noted. Herein, it is indicated that the Fe (200) crystal plane and the MgO (200) crystal plane are arranged parallel to the sample surface. Thereby, it was confirmed that the (100) plane of the single crystal MgO, and the (100) plane of the single crystal Fe are grown on the Si (100) single crystal substrate.

Figure 5:
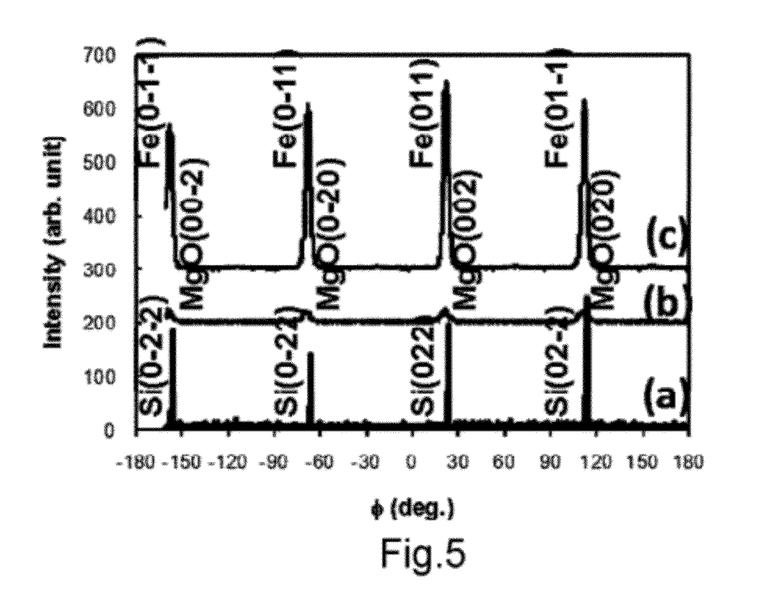
FIG. 5 gives a result of an in-plane X-ray diffraction measurement made for sample A in Example 1.

FIG. 5 gives a result of measurement of the Si (220) poles, the MgO (200) poles, and the Fe (110) poles in the in-plane X-ray diffraction measurement made for sample A in order to examine the orientation direction in the plane of the respective layers in the case where the respective layers were laminated in the aforementioned orientation. The in-plane measurement provides a measuring technique for evaluating the lattice plane perpendicular to the sample surface, the angle φ for the axis of abscissa corresponding to the orientation angle in the plane. Four diffraction peaks were observed for the Si (100) single crystal substrate; four diffraction peaks were observed for the MgO layer; and four diffraction peaks were observed for the Fe layer. Herein, the diffraction peak attributed to the (022) plane for the Si, the diffraction peak attributed to the (002) plane for the MgO, and further the diffraction peak attributed to the (011) plane for the Fe were observed at substantially the same relative angle in the sample plane. On the basis of this measurement result, in consideration of the Bragg angle for the respective crystal planes, it was confirmed that the Si (100) [110] direction, the MgO (100) [100] direction, and the Fe (100) [110] direction are parallel to one another in the plane.

Figure 6:
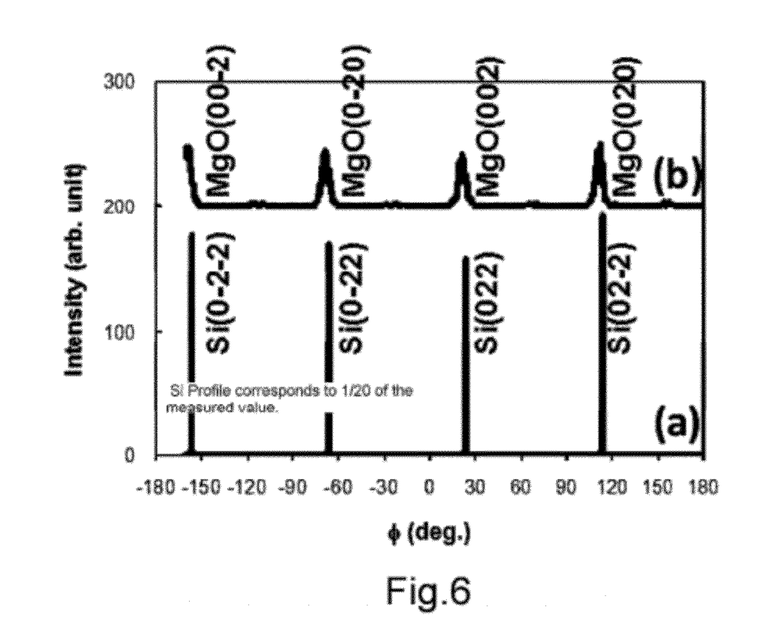
FIG. 6 gives a result of an in-plane X-ray diffraction measurement made for sample B in Example 1.

Further, in the structure of sample A, the X rays are absorbed in the Fe layer, resulting in the signal for the MgO layer, a lower layer thereof, being smaller. On the other hand, FIG. 6 gives a result of measurement of the Si (220) poles and the MgO (200) poles for sample B, having no Fe layer formed, that was made in the same way as in FIG. 5. On the basis of this result, it is obvious that there is provided a structure in which the MgO (100) [100] direction and the Si (100) [110] direction are arranged parallel to each other. In other words, the laminated interface between the MgO layer and the Si in Example 1 is lattice-matched, which results in scattering of spin-polarized electrons at this interface being suppressed. Thus, by laminating the ferromagnetic metal, an excellent ferromagnetic laminated film can be obtained.

Furthermore, between the Fe layer and the Si single crystal substrate, the ideal orientation relationship disclosed in Non-Patent Document 1 is established. Therefore, excellent properties will be provided which allow the laminated structure of sample A to be used as a spin injection electrode.

EXAMPLE 2

As Example 2, the following sample C was prepared to examine the structure thereof. In other words, the Si (100) substrate was cleaned with acetone and isopropyl alcohol, then the oxide film on the surface was removed with hydrofluoric acid, and in an MBE apparatus, with the degree of vacuum being set at $3 \times 10^{-8}$ Pa, the substrate was heated at a temperature of 500° C., which is lower than in Example 1. After the substrate being cooled to room temperature, an MgO layer having a film thickness of 1.4 nm, which is thinner than in Example 1, was formed by the electron-beam evaporation technique. Further, an Fe layer having a film thickness of 13 nm, which is the same as in Example 1, was formed by the electron-beam evaporation technique, and as a protection layer, a Ti layer having a film thickness of 3 nm, which is the same as in Example 1, was formed by the electron-beam evaporation technique (sample C).

Figure 7:
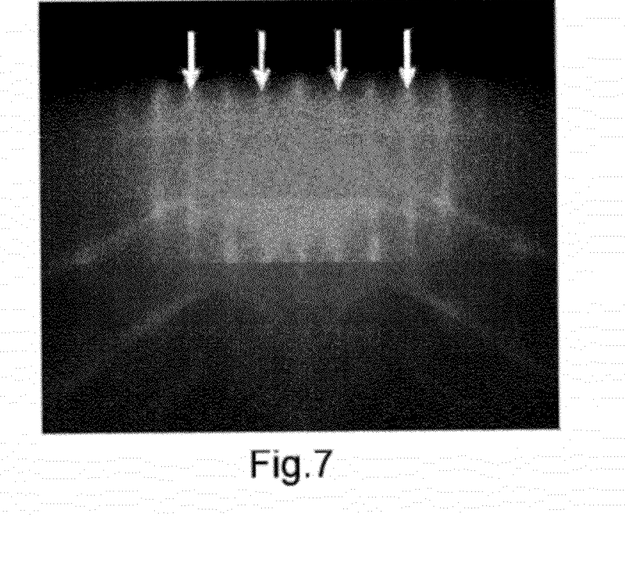
FIG. 7 is a Reflection High Energy Electron Diffraction (RHEED) photography of an Si surface (the (100) plane) obtained after heating the substrate at 500° C.

FIG. 7 is a photography of the result of a Reflection High Energy Electron Diffraction (RHEED) measurement made on an Si surface (the (100) plane) obtained after heating the substrate at 500° C. In this diffraction photography, as shown with arrows, streaks attributed to the 2×1 reconstructed surface can be observed. This means that, by performing heating treatment in vacuum after the oxide film being removed with hydrofluoric acid, a 2×1 reconstructed surface is formed on the Si (100) plane.

Figure 8:
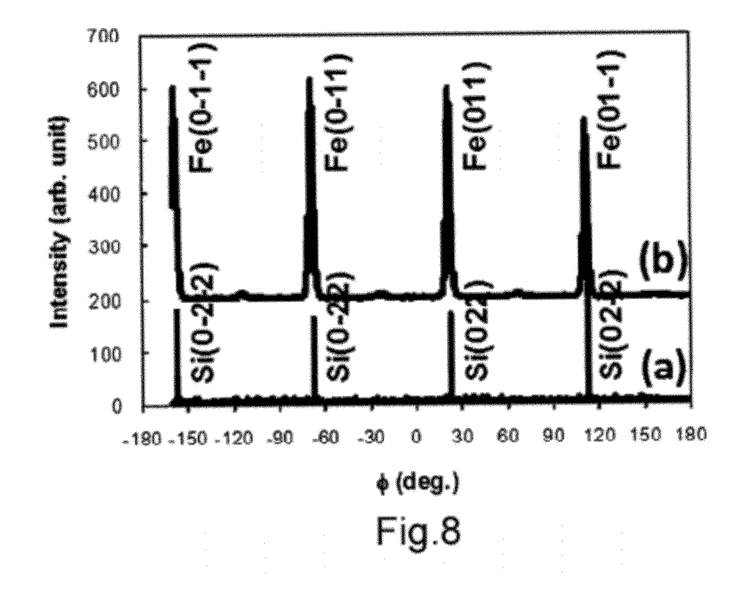
FIG. 8 gives a result of an in-plane X-ray diffraction measurement made for sample C in Example 2.

FIG. 8 gives a result of measurement of the Si (220) poles and the Fe (110) poles in the in-plane X-ray diffraction measurement made for sample C. It can be confirmed that, in the relationship for crystal orientation between the Fe layer and the Si (100) single crystal substrate in the growth plane, the Fe (100) [110] direction and the Si (100) [110] direction are parallel to each other, as is the case with sample A in Example 1.

Figure 9:
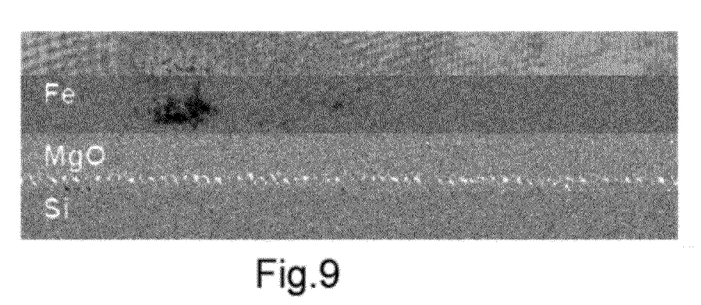
FIG. 9 is a transmission electron microscope photography of a section of sample C in Example 2.

Further, FIG. 9 is a photography of the result of observing a section of sample C with a transmission electron microscope. It can be confirmed that, at the respective interfaces, the lattices are matched, a flat and defect-free abrupt interface being obtained. This is attributed to that, in the structure obtained by the manufacturing method in Example 2, as is the case with sample A in Example 1, the MgO layer is lattice-matched with the Si (100) single crystal substrate and the Fe layer at the respective interfaces.

Further, the full widths at half maximum of the diffraction peaks for the Fe (110) poles shown as a result of the X-ray diffraction measurement in FIG. 8 provide an index of orientation dispersion for the Fe (110) crystal plane in the in-plane direction. The average of the full widths at half maximum of the four diffraction peaks is 3.1°, and as compared to sample D in Comparative Example 1 later given, a single crystal having a small crystal orientation dispersion and a high crystalline quality has been provided. In other words, as an effect of the lattice-matched crystal arrangement, an excellent crystal orientation quality can be obtained.

As described above, for sample C in Example 2, by sequentially depositing an MgO layer and an Fe layer on the 2×1 reconstructed surface on the Si (100) plane, a structure in which the lattices are matched at the respective interfaces has been provided. This lattice-matched crystal arrangement is the laminated structure disclosed in Non-Patent Document 1 that allows injection of tunneling electrons with a high spin polarization rate. Further, as an effect of the lattice-matched crystal arrangement, an Fe layer having few crystal defects can be obtained. The synergistic effect of these will provide excellent properties which allow the laminated structure of sample C to be used as a spin injection electrode.

COMPARATIVE EXAMPLE 1

As a comparative example, the following sample D was prepared to examine the structure thereof. In other words, the Si (100) single crystal substrate was cleaned with acetone and isopropyl alcohol, then the oxide film on the surface was removed with hydrofluoric acid, and in an MBE apparatus, with the degree of vacuum being set at $3 \times 10^{-8}$ Pa, the substrate was heated at a temperature of 200° C., which is lower than in Examples 1 and 2. After the substrate being cooled to room temperature, an MgO layer having a film thickness of 1.4 nm, which is the same as in Example 2, was produced by the electron-beam evaporation technique. Further, an Fe layer having a film thickness of 13 nm, which is the same as in Example 1, was produced by the electron-beam evaporation technique, and as a protection layer, a Ti layer having a film thickness of 3 nm, which is the same as in Example 1, was produced by the electron-beam evaporation technique (sample D).

Figure 10:
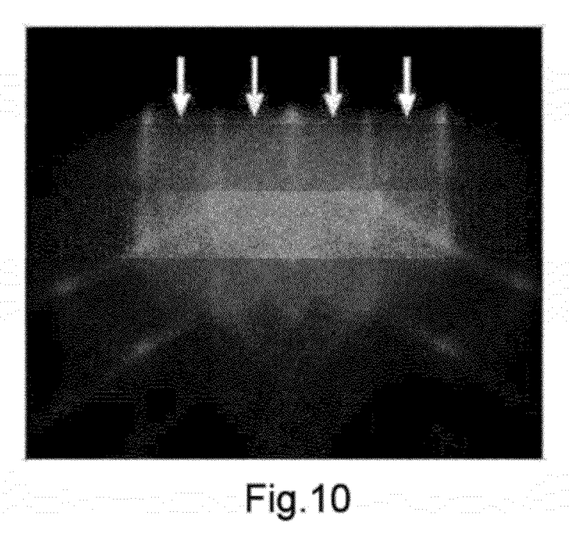
FIG. 10 is a Reflection High Energy Electron Diffraction (RHEED) photography of an Si surface (the (100) plane) obtained after heating the substrate at 200° C.

FIG. 10 is a photography of the result of a Reflection High Energy Electron Diffraction (RHEED) measurement made, in the same way as in FIG. 7, on an Si surface (the (100) plane) obtained by heating the substrate at 200° C. Contrarily to the result in FIG. 7, only the streaks attributed to the 1×1 structure of the Si bulk are observed, and in the places as indicated with arrows, no streaks attributed to the 2×1 reconstructed surface can be observed. In other words, no 2×1 reconstructed surface has been formed.

Figure 11:
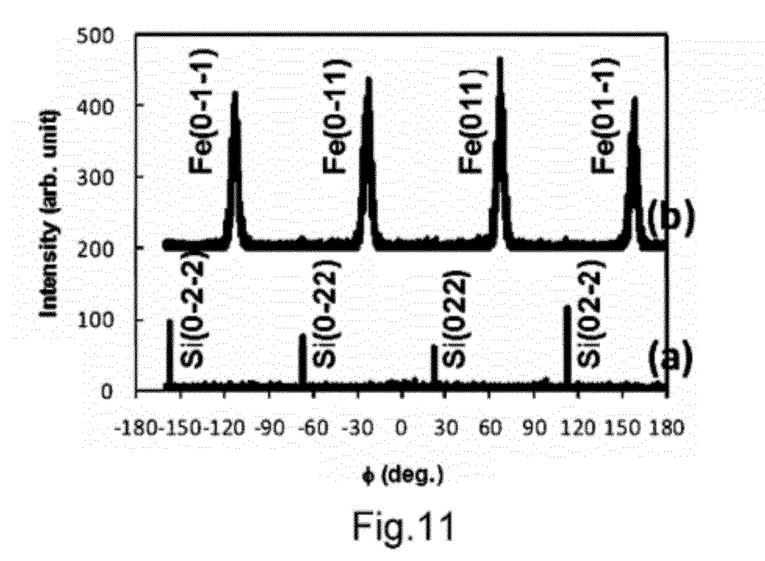
FIG. 11 gives a result of an in-plane X-ray diffraction measurement made for sample D in Comparative Example 1.

FIG. 11 gives a result of measurement of the Si (220) poles and the Fe (110) poles in the in-plane X-ray diffraction measurement made for sample D. From this result, it is obvious that, unlike in Examples 1 and 2, the Fe [110] direction and the Si [110] direction are not parallel to each other, while the Fe [100] direction and the Si [110] direction are parallel to each other. In other words, the Fe and Si orientations are misaligned by approx. 45°, compared to sample A in Example 1 and sample C in Example 2. This structure is not the ideal structure disclosed in Non-Patent Document 1, but the same structure as that of the laminated film disclosed in Non-Patent Document 2.

Therefore, in case where the Si (100) plane on which the MgO layer is formed has a 1×1 structure, which is different from the structure of the 2×1 reconstructed surface, even if an MgO layer is laminated, the same lattice-matched structure as that in Examples 1 and 2 cannot be obtained.

In addition, the average of the full widths at half maximum of the diffraction peaks for the Fe (110) poles in FIG. 11 is 5.3°, which is large, as compared to that for sample C in Example 2. This means that, since the laminated film of sample D in Comparative Example 1 is not a matched arrangement, an excellent orientation quality cannot be obtained. In addition, the atomic arrangement at the interface between the MgO and the Si has a structure as shown in FIG. 3(C), which is not a lattice-matched crystal arrangement, thus there exist a number of crystal defects, scattering tunneling electrons, which makes it impossible to inject electrons with a high efficiency. Further, with this laminated film, the combination of orientations for the Fe and the Si is different from the combination of orientations that allows injection of electrons with a high spin polarization rate, as disclosed in Non-Patent Document 1, which also make it impossible to inject tunneling electrons with a high spin polarization rate. In this point, the structure of sample D is the same as the structure disclosed in Non-Patent Document 2.

EXAMPLE 3

As Example 3 of the present invention, the following sample E was prepared to examine the structure thereof. In other words, the Si (100) single crystal substrate was cleaned with acetone and isopropyl alcohol, then the oxide film on the surface was removed with hydrofluoric acid, and further, using a hydrochloric acid-hydrogen peroxide-water mixture, an oxide film was formed. Thereafter, in an MBE apparatus, with the degree of vacuum being set at $3\times10^{-8}$ Pa, the substrate was heated at 1000° C., the same temperature as that in Example 1, to remove the oxide film. As has been described above, a 2×1 reconstructed surface is formed on this surface. After the substrate being cooled to room temperature, an MgO layer having a film thickness of 0.8 nm, which is thinner than in Examples 1 and 2, was formed by the electron-beam evaporation technique. Further, an Fe layer having a film thickness of 13 nm, which is the same as in Example 1, was produced by the electron-beam evaporation technique, and as a protection layer, a Ti layer having a film thickness of 3 nm, which is the same as in Example 1, was produced by the electron-beam evaporation technique (sample E).

Figure 12:
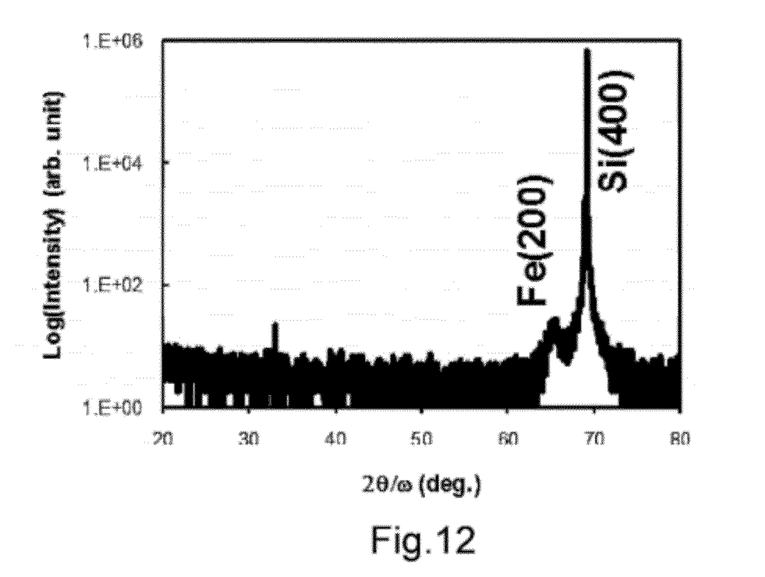
FIG. 12 gives a result of an out-of-plane X-ray diffraction measurement made for sample E in Example 3.

FIG. 12 gives a result of an out-of-plane X-ray diffraction measurement made for sample E in Example 3 in the same way as in FIG. 4. For the respective diffraction peaks, the plane orientation of the corresponding substance is noted. Herein, it is indicated that the Fe (200) crystal plane and the MgO (200) crystal plane are arranged parallel to the sample surface. This means that, also in sample E, the Si (100) plane is grown parallel to the Fe (100) plane.

Figure 13:
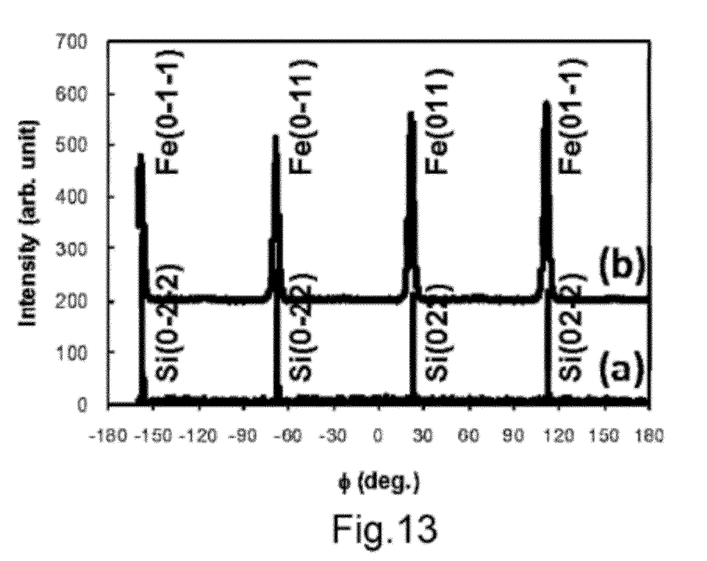
FIG. 13 gives a result of an in-plane X-ray diffraction measurement made for sample E in Example 3.

FIG. 13 gives a result of measurement of the Si (220) poles and the Fe (110) poles in the in-plane X-ray diffraction measurement made for sample E. It can be confirmed that there is provided a crystal orientation relationship between the Fe and the Si in which the Fe (100) [110] direction and the Si (100) [110] direction are parallel to each other, as is the case with sample A in Example 1 and sample C in Example 2. In other words, as in Example 1 and Example 2, it is possible to inject tunneling electrons with a high spin polarization rate.

Further, the average of the full widths at half maximum of the diffraction peaks for the Fe (110) poles in FIG. 13 is 5.3°, the crystal orientation dispersion being small, as compared to that for sample D in Example 1. This means that, as an effect of the lattice-matched crystal arrangement, an excellent orientation quality can be obtained.

In addition, the film thickness of the MgO layer in sample E is as thin as 0.8 nm, which allows a large tunneling current to be provided. Therefore, by using this ferromagnetic laminated structure for devices, lowering the device resistance can be implemented, thus devices excellent in high-frequency characteristics and signal-to-noise ratio can be realized.

In any one of the above examples, Fe is used as the material for the ferromagnetic metal layer, however, the material for the ferromagnetic metal layer is not limited to Fe, and an FeCo alloy may also be used. The film thickness and the like may be varied, being not restricted to the aforementioned range. The conditions for manufacture may be varied while remaining within the spirit and scope of the present invention.
10 ferromagnetic laminated structure
11 Si single crystal substrate
12 single crystal MgO layer
13 ferromagnetic metal layer
111 Si atom
121 Mg atom
122 oxygen (O) atom

What is claimed is:

1. A ferromagnetic laminated structure in which a magnesium oxide (MgO) layer and a ferromagnetic metal layer are sequentially formed on a silicon (Si) single crystal for injecting electrons from the ferromagnetic metal layer into the Si single crystal, the ferromagnetic laminated structure comprising:
   the substrate plane of the Si single crystal being the (100) plane, and the growth plane of the MgO layer being the (100) plane; and
   the [110] direction on the substrate plane of the Si single crystal and the [100] direction on the growth plane of the MgO layer being parallel to each other.

2. The ferromagnetic laminated structure according to claim 1, wherein the ferromagnetic metal layer is formed of iron (Fe) or an alloy of iron and cobalt (Co) (an FeCo alloy), the growth plane of the ferromagnetic metal layer being the (100) plane, and the [110]direction on the substrate plane of the Si single crystal, the [100] direction on the growth plane of the MgO layer, and the [110] direction on the growth plane of the ferromagnetic metal layer being parallel to one another.

3. The ferromagnetic laminated structure according to claim 1, wherein the MgO layer has a thickness in the range of 0.6 nm to 5 nm.

4. The ferromagnetic laminated structure according to claim 2, wherein the MgO layer has a thickness in the range of 0.6 nm to 5 nm.

5. A method of manufacturing the ferromagnetic laminated structure according to claim 1, comprising:
   forming a 2×1 reconstructed surface on the substrate surface of the Si single crystal, being followed by sequentially forming the MgO layer and the ferromagnetic metal layer in vacuum.

6. A method of manufacturing the ferromagnetic laminated structure according to claim 2, comprising:
   forming a 2×1 reconstructed surface on the substrate surface of the Si single crystal, being followed by sequentially forming the MgO layer and the ferromagnetic metal layer in vacuum.

7. A method of manufacturing the ferromagnetic laminated structure according to claim 3, comprising:
   forming a 2×1 reconstructed surface on the substrate surface of the Si single crystal, being followed by sequentially forming the MgO layer and the ferromagnetic metal layer in vacuum.

8. A method of manufacturing the ferromagnetic laminated structure according to claim 4, comprising:
   forming a 2×1 reconstructed surface on the substrate surface of the Si single crystal, being followed by sequentially forming the MgO layer and the ferromagnetic metal layer in vacuum.

9. The method of manufacturing the ferromagnetic laminated structure according to claim 5, wherein the MgO layer is formed by the MBE (Molecular Beam Epitaxy) technique or the electron-beam evaporation technique.

10. The method of manufacturing the ferromagnetic laminated structure according to claim 6, wherein the MgO layer is formed by the MBE (Molecular Beam Epitaxy) technique or the electron-beam evaporation technique.

11. The method of manufacturing the ferromagnetic laminated structure according to claim 7, wherein the MgO layer is formed by the MBE (Molecular Beam Epitaxy) technique or the electron-beam evaporation technique.

12. The method of manufacturing the ferromagnetic laminated structure according to claim 8, wherein the MgO layer is formed by the MBE (Molecular Beam Epitaxy) technique or the electron-beam evaporation technique.

\* \* \* \* \*